United States Patent [19]

Garlung et al.

[11] 4,346,808
[45] Aug. 31, 1982

[54] DEVICE FOR USE IN WELDING REINFORCEMENT MEMBERS TO PANEL PLATES

[75] Inventors: Walther Garlung, Kalandseid; Helge Dahl, Os, both of Norway

[73] Assignee: Total Transportation Systems (International) A/S, Os, Norway

[21] Appl. No.: 58,460

[22] Filed: Jul. 18, 1979

[30] Foreign Application Priority Data

Mar. 30, 1979 [NO] Norway .................................. 791077

[51] Int. Cl.³ .............................................. B66C 5/04
[52] U.S. Cl. .................................... 212/212; 212/221; 219/158
[58] Field of Search ...................... 219/125.1, 158, 161, 219/137.41, 124.1, 124.21, 124.22; 212/242, 225, 260, 252, 253, 224, 221, 243, 251, 84; 228/47, 49 R, 44.1; 294/65.5

[56] References Cited

U.S. PATENT DOCUMENTS

| | | | |
|---|---|---|---|
| 577,329 | 2/1897 | Slawianoff | 219/137 R X |
| 4,002,243 | 1/1977 | Kramer | 212/225 |
| 4,169,977 | 10/1979 | Pedersen | 219/125.1 |

*Primary Examiner*—H. Grant Skaggs
*Attorney, Agent, or Firm*—Darby & Darby

[57] ABSTRACT

Apparatus for transporting and positioning sectional reinforcement members relative to a panel plate in which a boom is pivotally mounted about a vertical axis and carries a plurality of members for gripping a selective reinforcement member, a plurality of magnets for holding a panel plate and a plurality of jacks for holding a sectional reinforcement member against the panel plate while the member is tack welded to the plate.

14 Claims, 3 Drawing Figures

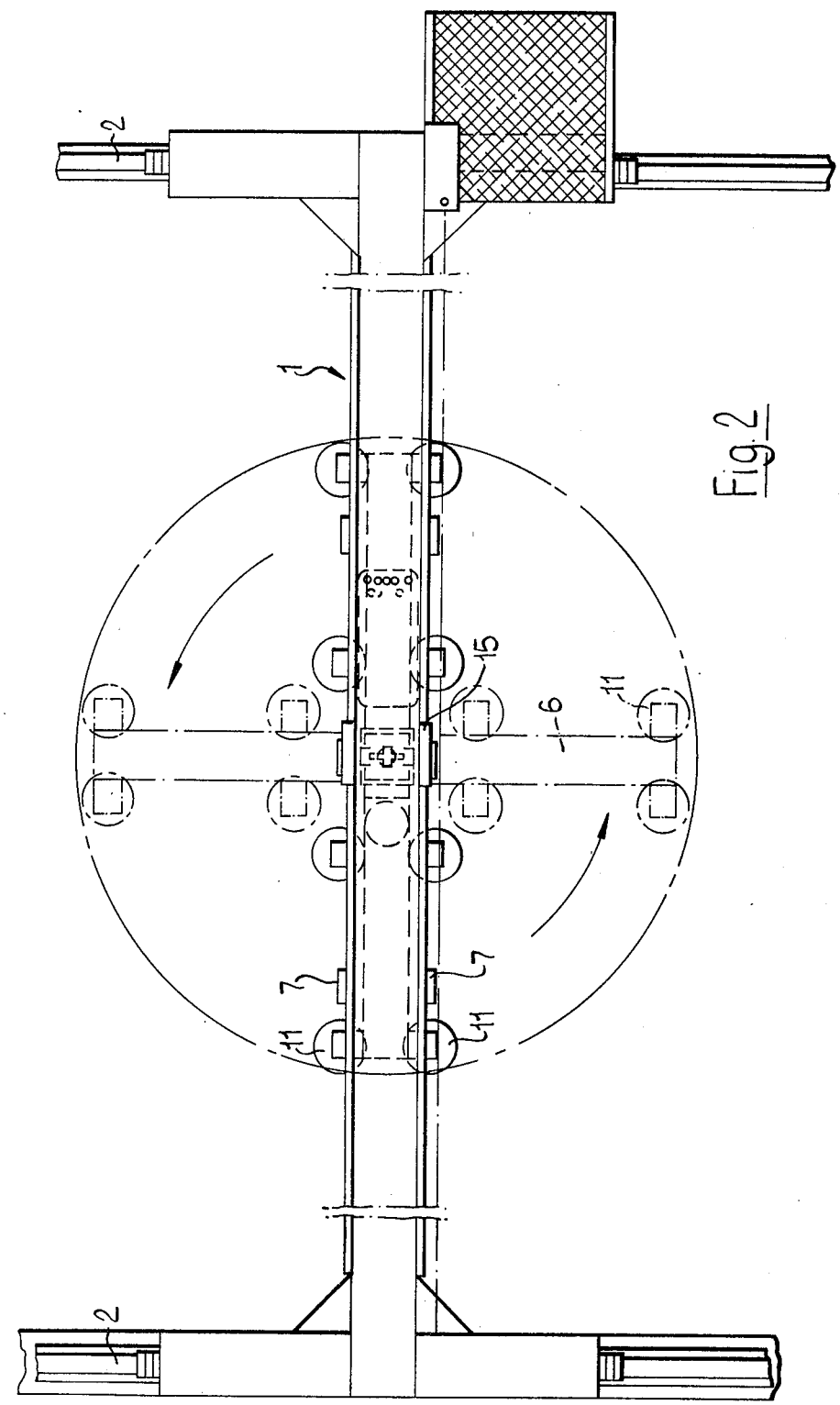

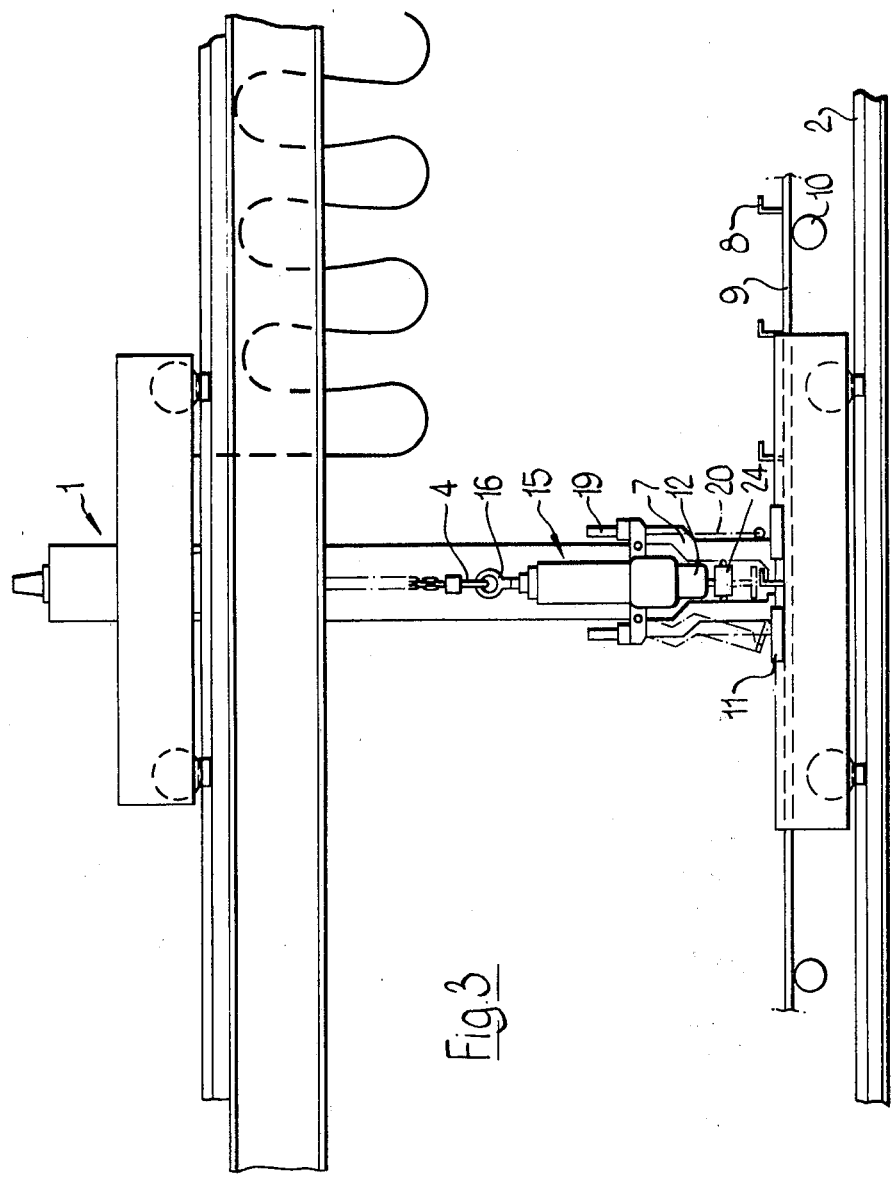

DEVICE FOR USE IN WELDING REINFORCEMENT MEMBERS TO PANEL PLATES

BACKGROUND OF THE INVENTION

The present invention relates to a device for transporting, positioning and adjusting of sectional reinforcement members for tack welding or the like in the assembly of panel plates or the like. It includes a plurality of gripping means for the sectional reinforcement member, a plurality of lifting magnets for the panel plate and a plurality of jack means for pressing the sectional member against the panel plate during the tack welding or the like.

A device of this type is described in the copending U.S. Patent application Ser. No. 850,265 filed Nov. 10, 1977, now U.S. Pat. No. 4,169,977 granted Oct. 2, 1979. In this device the lifting magnets for the panel plate and the jack means for pressing the sectional member against the panel plate are arranged on a jig which is movable along a yoke which itself is supported in a gantry which is movable on rails which extend transversally of the longitudinal direction of the gantry. The yoke can only be moved a limited amount with respect to the gantry and the device may therefore only be used for sectional members which are to be oriented generally parallel to the gantry. The ends of the yoke can be moved only a limited amount with resect to each other in the vertical direction and the device may therefore not be used where the panel plate slopes with respect to the longitudinal direction of the gantry. Furthermore, the yoke is straight and relatively long, resulting in that it cannot be used for panel plates for smaller vessels, bow and stern sections and vessels having particularly fine lines where a large part of the sections have a certain curvature. In addition, the cost of said device makes it difficult to obtain the necessary economic return in smaller shipyards.

BRIEF DESCRIPTION OF THE INVENTION

The object of the present invention is to overcome said drawbacks and deficiencies of the previously known devices. According to the invention this is accomplished by means of a device of the type mentioned in which the gripping means, the lifting magnets and the yoke means are arranged on a boom means, with the boom means being equipped with means for suspension in a crane or the like.

By suspending the boom means freely, sectional members held by the boom means of the gripping means may be oriented in any direction in the horisontal plane. Furthermore, the boom may be brought in position with respect to plates laying in a position with a relatively large slope and it may therefore also handle sectional members which are not straight. In many cases this will give better utilization of the production areas because the panel plates may be oriented in the most suitable direction without regard to particular patterns of the profiles. Also the device according to the invention is substantially simpler and lighter than the previously known devices, thus resulting in great savings. Furthermore, the applicability of the device is increased since it may be used with already existing crane equipment.

Further advantageous features of the invention will be apparent from the following description of the exemplifying embodiment shown in the appended drawings.

BRIEF DESCRIPTION OF THE DRAWINGS

FIG. 2 shows the device of FIG. 1 in plan view; and

FIG. 3 shows the device of FIG. 1 in end elevation.

DETAILED DESCRIPTION OF INVENTION

Figure 1:
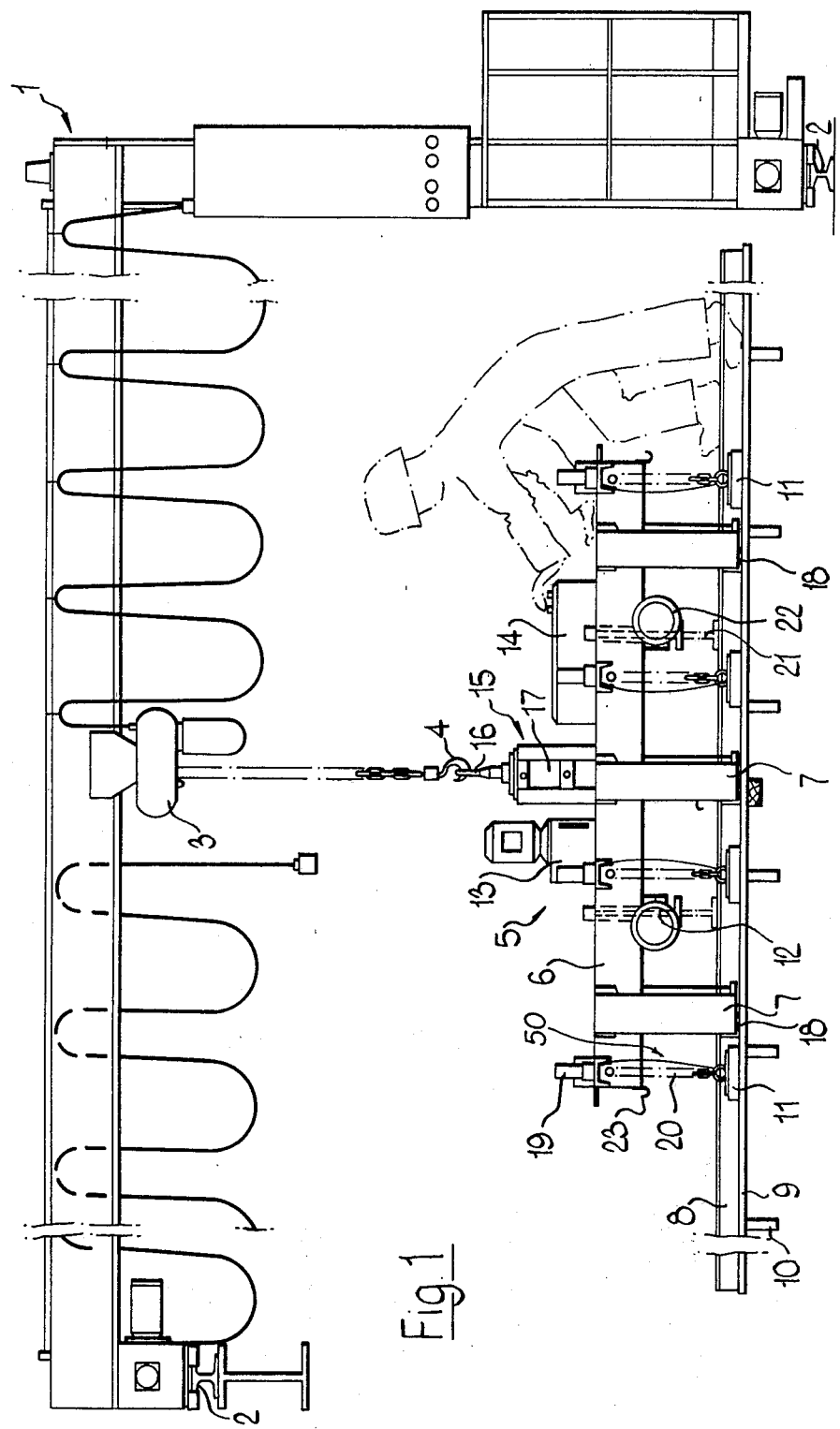
FIG. 1 shows a device according to the invention in side elevation.

In FIG. 1 reference numeral 1 generally designates a gantry crane device which is movable on rails 2. The crane device 1 has a crab 3, with a lifting hook 4 on which is suspended a device according to the invention generally designated 5.

The device 5 comprises a boom means 6 which is equipped with gripping means 7 for holding a sectional member 8 during the latter's transportation and positioning on a panel plate 9 resting on supporting rails 10. The boom means 6 is further equipped with lifting magnets 11 for the panel plate 9 and jack means 12 for pressing the sectional member 8 against the panel plate 9 during tack welding of the member and plate together. The boom means 6 also supports a hydraulic unit 13 and a control board 14 for the gripping means 7, the lifting magnets 11 and the jack 12.

The boom means 6 is equipped with a central suspension device 15 including a suspension eye 16 which preferably is rotatable with respect to the boom means. Hereby the boom means may be rotated about a vertical axis as indicated with broken lines and arrows in FIG. 2. The suspension eye 16 may advantageously be connected to a spring device 17 which preferably is adjustable. By the aid of this spring device the sectional member 8 may without difficulty be placed on the panel plate 9 without any substantial part of the weight of the device 5 being transferred to the panel plate and causing undesirable deflection of the plate. This is of particular importance for thin panel plates.

Gripping means includes pairs of legs 7 (FIG. 3) which are pivotably supported at their upper ends in the boom means 6 and are thus mounted thereto, by a suitable means. The legs 7 are pivotable towards and away from each other in a plane extending generally transversally of the longitudinal axis of the boom means 6. This pivotability is indicated in broken lines for one of the legs 7 in FIG. 3. The pivoting motion can advantageously be caused by a hydraulic cylinder 24 (FIG. 3) extending generally horizontally between the legs of each pair and being pivotably connected to both legs. The legs 7 of each pair may thus be clamped against each other for holding a sectional member 8 which concurrently is aligned with a longitudinal axis of the boom. This clamping function may also be utilized for fetching sectional members from a store and bringing them to the correct position on the plate 9 where they are to be welded.

Some of the legs 7 may at their lower end be equipped with rollers 18 (FIG. 2) in order to make the device 5 easily movable on the panel plate 9. The rollers may advantageously be formed by ball rollers so that the device 5 may be moved easily in all directions on the panel plate.

When the sectional member 8 has been positioned as mentioned above, it is lowered onto the panel plate. This is accomplished by letting the rollers 18 move upwards with respect to the legs 7, e.g. by letting the rollers 18 be hydraulically movable in the vertical direction. In this position the sectional member 8 is pressed into contact with the panel plate 9 by releasing the lifting magnets 11 of the boom means holding the boom to the panel plate while the jacks 12 press the sectional member against the panel plate. Thereafter the sectional member and panel plate are tack welded together. If the sectional member is substantially longer than the boom means 6, the first welding will be performed at the middle portion of the sectional member, whereupon one successively works towards the ends. Thus, it is possible to cover a relatively large spectrum of sectional member dimensions with respect to both cross section and length.

The lifting magnets 11 are connected to hydraulic cylinders 19 for the boom means 6 by chains 20. The chains fulfill their function in a particularly advantageous manner by transmitting tension without any possible stretching and concurrently they permit any necessary movability of the lifting magnets in the horisontal plane. The lifting magnets may advantageously also be equipped with a separate quick release pull up means (50) for rapidly moving the magnets away from panel plate 9 and thereby moving them out of the way when sectional members are to be fetched and brought in position. In this case the chains 20 will not be any hindrance due to their lack of rigidity.

The jacks 12, which are used to press the sectional member 8 against the panel plate 9, are mounted to the boom means 6 by a suitable means and may advantageously be equipped with extendable piston rods 21 which may be operated by means of wheels 22. Thus, the jack means may quickly be brought out of the way during transportation of sectional members.

To make the boom device 6 even more applicable, it may be equipped with lifting hooks 23 which preferably are located at its ends. The lifting hooks permit the use of slings, clamps or the like in order to fetch hard to reach sectional members in storage. It may also be advantageous to equip the boom means 6 with its own lamps (not shown) to ensure good working light anywhere the device 5 is to be used. Of course the device will have to be fed with electrical power for the hydraulic unit, the lifting magnets, the lamps, the welding apparatus and any electrical control means. To avoid loose lines and cables on the floor, it may be advantageous to run the power along the suspending crane.

From the examplifying embodiment shown in the foregoing it will be understood that one according to the invention has obtained all its objects in a simple and inexpensive way. In addition, risky use of chains and slings for manuvering the sectional members in place is avoided as is the risk that sectional members may tumble before they are properly tack welded. Furthermore, aligning and positioning of the sectional member can be accomplished very quickly and simply.

We claim:
1. Apparatus for transporting and positioning a sectional reinforcement member relative to a panel plate to which it is to be attached comprising:
   boom means,
   means angularly movable about a generally vertical axis for connecting said boom means to a crane,
   a plurality of gripping means for holding a sectional reinforcement member,
   first means for mounting said plurality of gripping means to said boom means,
   a plurality of lifting magnets for holding a panel plate,
   second means for mounting said plurality of lifting magnets to said boom means,
   at least one jack means for pressing said sectional reinforcement member against said panel plate,
   said boom means being equipped with said at least one jack means.
2. Apparatus as in claim 1 wherein each of said plurality of gripping means comprises a pair of legs, and means for pivotally moving the legs of a pair toward and away from each other in a plane extending generally transverse to a longitudinal axis of said boom means.
3. Apparatus as in claim 2 further comprising roller means mounted at the free ends of said legs.
4. Apparatus as in claim 3 wherein said roller means are vertically movable relative to the respective leg.
5. Apparatus as in claim 1 wherein said boom mounting means includes elastic means.
6. Apparatus as in claim 5 wherein said elastic means comprise spring means.
7. Apparatus as in claim 1 further comprising lifting hooks attached to said boom means.
8. Apparatus as in claim 1 further comprising at least one lamp means mounted on said boom means.
9. Apparatus as in claim 1 wherein said second means comprises an inelastic elongated member.
10. Apparatus as in claim 9 wherein said inelastic elongated member comprises a chain.
11. Apparatus as in claim 1 wherein said second means comprises means for rapidly moving a said magnet means away from said panel plate.
12. Apparatus as in claim 1 wherein said jack means comprises an extendable piston rod.
13. Apparatus as in claim 1 further comprising carriage means for moving said angularly movable means to which the boom is mounted for carrying said boom means along a path in a first direction.
14. Apparatus as in claim 13 further comprising gantry means movable in a second direction generally transverse to said first direction, said carriage means mounted in said gantry means.

* * * * *